July 18, 1933.　　　P. McSHANE　　　1,918,978
FIELD FAILURE PROTECTIVE RELAY
Filed Oct. 20, 1930
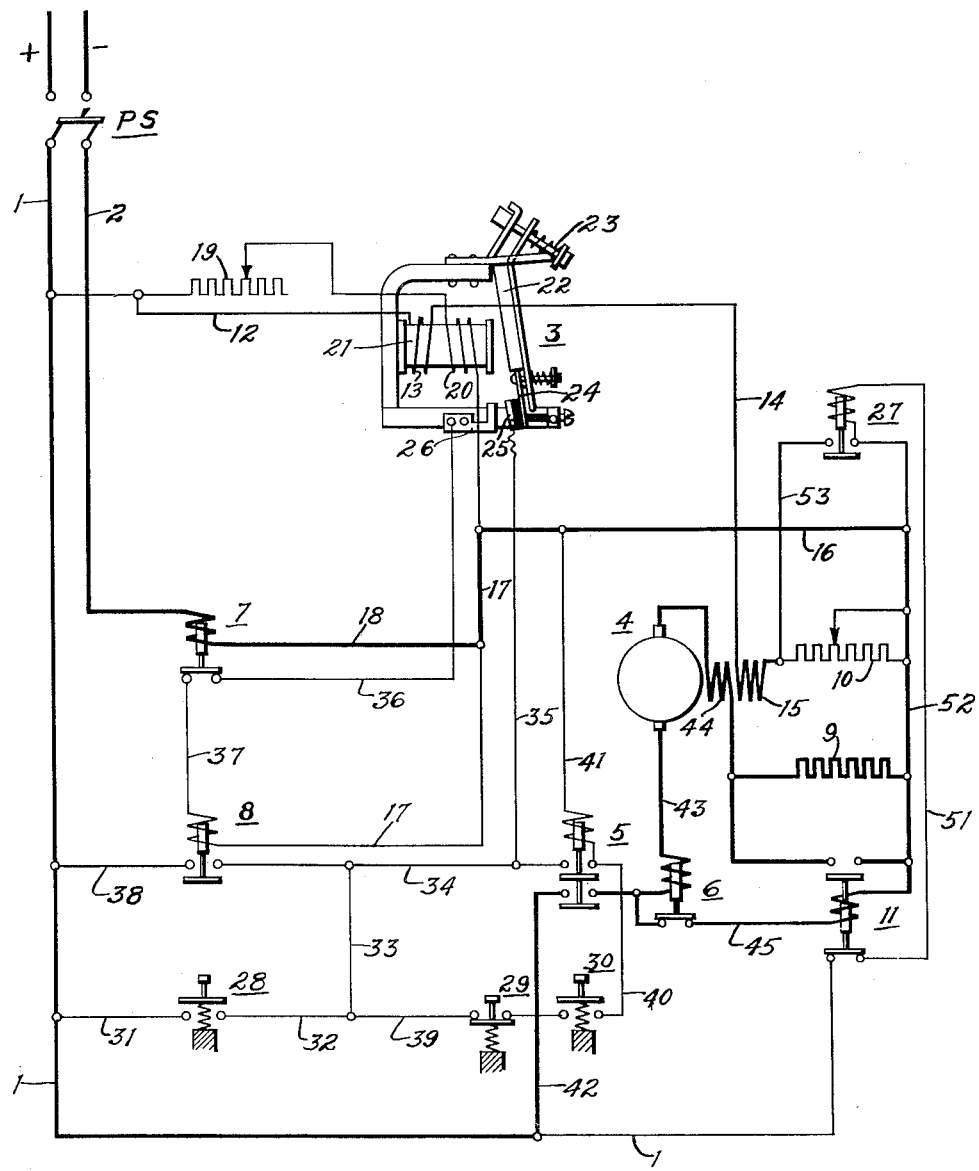
INVENTOR
Phelan McShane
BY
Wesley G. Carr
ATTORNEY Patented July 18, 1933

1,918,978

UNITED STATES PATENT OFFICE

PHELAN McSHANE, OF PITTSBURGH, PENNSYLVANIA, ASSIGNOR TO WESTINGHOUSE ELECTRIC & MANUFACTURING COMPANY, A CORPORATION OF PENNSYLVANIA

FIELD FAILURE PROTECTIVE RELAY

Application filed October 20, 1930. Serial No. 489,868.

My invention relates, generally, to electrical protective devices. More particularly, my invention relates to electrical systems for protecting direct-current motors against over-speeding.

The demand for motors having a wide speed range is increasing, and motors having a six-to-one speed range are not uncommon. Such a wide speed range is accomplished by changing the position of the contact arm of the field rheostat. In the operation of motors, it sometimes happens that the field circuit is opened, either maliciously, inadvertently or by accident, resulting in destructive speeds of the motor and the devices driven by it.

Attempts have been made to utilize relays heretofore known to protect against the damage to machines that follows a field failure caused by the interruption of the field circuit but without success. With the relays heretofore known, when the field was very weak, there was a tendency for the relay to "drop out", with the result that it was invariably adjusted to assure that it would stay "in". With such adjustment, the residual magnetism in the magnetic circuit of the relay is frequently sufficient to cause the relay to be maintained in closed position and thus defeat the very purpose for which it was installed.

One of the objects of my invention is to provide for reliably protecting a motor against excessive speeds.

More specifically stated, it is an object of my invention to provide for disconnecting a motor from the source of electric energy whenever the field excitation of the motor is reduced to a predetermined value, thereby serving to prevent the acceleration of the motor to an excessive and dangerous speed.

Other objects and advantages of my invention will become evident from the following detailed description, taken in conjunction with the accompanying drawing, in which, the single figure shows, schematically, the various elements of my invention in deenergized positions i. e., the positions they occupy when the power switch (PS) is in open-circuit position, as shown.

Referring to the drawing, 1 and 2 designate the positively and negatively energized conductors leading from a direct-current source of supply (not shown) to the various electrical devices of my system. At 3, is shown a field-failure protective relay which controls the operation of the low-voltage relay 8 and the line contactor 5. At 4, the motor which is to be protected is shown. The motor is provided with a series field winding 44 and a shunt field winding 15, the shunt field winding being provided with a field rheostat 10, and a full-field relay 27 is disposed to short-circuit the field rheostat 10. A starting resistor 9, controlled by the accelerating relay 11, and a current relay 6 are also associated with the motor 4. A push-button switch 28 serves to reset the low-voltage relay 8, as will be pointed out more in detail hereinafter. The push-button switches 29 and 30 are stopping switches and starting switches, respectively.

In the operation of my system, the closure of the power-switch PS establishes a circuit which extends from the positively energized conductor 1, through the interlock of the accelerating relay 11, conductor 51, the actuating coil of the full-field relay 27, conductors 52, 16, 17 and 18 and the actuating coil of the overload relay 7, to the negatively energized conductor 2. A circuit is also established from the positively energized conductor 1, through the variable resistor 19, demagnetizing coil 20 of the field-failure protective relay 3, conductors 17 and 18 and the actuating coil of the overload relay 7, to the negatively energized conductor 2.

At the instant the full-field relay 27 operates, a circuit is established from the positively energized conductor 1, through conductor 12, magnetizing coil 13 of the field-failure protective relay 3, conductor 14, shunt field winding 15 of the motor 4, conductor 53 and the contact members of the full-field relay 27, to the negatively energized conductor 52. It will, of course, be apparent that the closing of the power switch PS establishes the circuit just traced through the shunt field winding and the field rheostat 10 but such circuit is of momentary duration and is thus unimportant during the starting operation.

The field-failure protective relay comprises a core 21 and an armature 22 of magnetic material, a tension-adjusting means 23 for the armature and a pivotally mounted spring-biased member 24, carrying an insulated contact member 25, and a contact member 26. The magnetic effect of the neutralizing coil 20 is opposite to the magnetic effect of the magnetizing coil 13 but their relative magnetic effects are such that when both are energized, the contact members 25 and 26 stand in closed position.

During the starting operation of the motor, as will be pointed out more in detail hereinafter, a comparatively heavy current passes through coil 13, thus readily moving the armature 22 of relay 3. During normal operation, the current passing through coil 13, even for the highest operating speeds, is sufficient to hold the relay closed, but its magnetic effect is only sufficient to overcome the frictional resistance of relay 3, the magnetic effect of coil 20, and the effect of the spring biasing the armature 22. It is thus obvious that the relay will release its armature whenever the current through coil 13 drops below a predetermined value. By a proper adjustment of either the adjusting means 23 or the variable resistor 19 or both, the relay may be made to operate for any given low field excitation of the motor. Furthermore, there is no danger of the relay remaining in operated position by reason of its residual magnetism. The coil 20 assures that the magnetism in the magnetic circuit of the relay always drops to zero whenever the current traversing the field windings 15 drops to a predetermined low value.

While the full-field relay is in the operated position above explained, the field rheostat 10 is shunted and, in consequence, the field excitation is comparatively great. The field-failure protective relay will, therefore, operate immediately after the closing of the full-field relay 27.

Assuming that the attendant operates the push-button switch or reset switch 28, a circuit is established which extends from the positively energized conductor 1, through conductor 31, the contact elements of the reset switch 28, conductors 32, 33, 34 and 35, the contact members 25 and 26 of the field-failure protective relay 3, conductor 36, the contact members of the overload protective relay 7, conductor 37, the actuating coil of the low-voltage protective relay 8, conductors 17 and 18 and the actuating coil of the overload protective relay 7, to the negatively energized conductor 2. In this manner, the low-voltage protective relay 8 is actuated and a holding circuit is established which extends from the positively energized conductor 1, through conductor 38 and the contact members of the low-voltage protective relay 8, to the negatively energized conductor 34.

The operation of the starting push-button switch 30 establishes a circuit from the positively energized conductor 1, through the conductor 38, contact members of the low-voltage protective relay 8, conductors 34, 33 and 39, the stopping-push-button switch 29, the starting push-button switch 30, the conductor 40, the actuating coil of the line contactor 5 and conductor 41, to the negatively energized conductor 16. Operation of the line contactor 5 establishes a holding circuit for the line contactor through the upper contact members of the line contactor.

Operation of the line contactor 5 also establishes an armature circuit for the motor 4 which may be traced from the positively energized conductor 1, through conductor 42, the lower contact members of the line contactor 5, the actuating coil of the current relay 6, conductor 43, the armature of motor 4, the series field winding 44 and the starting resistor 9, to the negatively energized conductor 52. Since the initial rush of current through the circuit just traced will be relatively high, the current relay 6 will move to its operated position, thereby preventing energization of the accelerating relay 11.

As the motor accelerates, the armature current decreases and, after a substantially predetermined interval of time, depending upon the load conditions on the motor, the current relay 6 moves to the position shown in the drawing and, in consequence, a circuit is established from the positively energized conductor 42, through the lower contact members of the line contactor 5, the contact members of the current relay 6, conductor 45 and the actuating coil of the accelerating relay 11, to the negatively energized conductor 52. Operation of the accelerating relay 11 establishes a shunt circuit for the starting resistor 9 in a well known manner. The operation of the accelerating relay 11 also causes its lower contact members to be moved to its open-circuit position, whereby the full-field relay 27 is deenergized and, in consequence, the shunt-field excitation is decreased to a value dependent upon the position of the contact arm of the field rheostat 10.

Since the magnetizing coil 13 of the field-failure protective relay 3 is connected in series-circuit relation to the shunt field windings 15, the magnetizing effect of the coil 13, will, at all times, be a function of the field excitation of the motor 4, and, for the normal speed range of the motor, the magnetizing effect of coil 13 will always be just sufficient to hold the armature of the relay and, in consequence, the contact members 25 and 26 in circuit-closing position. The magnetizing effect of the coil 20 is in opposition to the magnetizing effect 13 and when, through inadvertent operation of the field rheostat 10, the field excitation of the motor is decreased below a predetermined value, or if the field circuit should, for some reason, become interrupted, the neutralizing coil 20 will demagnetize the relay 3 and, in consequence, the contact members 25 and 26 will move to their open-circuit position, thereby interrupting the circuit for the actuating coil of the low-voltage protective relay 8 and the actuating coil of the line contactor 5, thus causing the interruption of the armature circuit of the motor.

It should be apparent that the foregoing discussion presupposes that the change in the field excitation is of some permanent character, that is, continues for at least some predetermined minimum interval of time. If the circuit of the field winding is opened, or the rheostat arm of the rheostat 10, as stated, is moved to insert all of the resistor sections thereof in the field circuit, the change is not transient or temporary. For transient changes, as is apparent from the drawing, the relative inductive effect of series field winding 44 and shunt field winding 15, and the coils 13 and 20, respectively, is such that the operation of the relay 3 is delayed. Transient changes, whether occurring in the armature or shunt field winding, do not effect the opening of the line contactor.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. A protective system for motors, in combination, a motor having a shunt field winding and a variable rheostat therefor, a source of electrical energy for the motor, a field-failure protective relay including a magnetizing coil connected in series-circuit relation to the shunt field winding and field rheostat, a neutralizing coil and a variable resistor therefor connected in parallel-circuit relation to the field winding, and a line contactor controlled by the field-failure protective relay.

2. In a control system for an electric motor, in combination, a motor having a field winding, a field-failure protective relay having a magnetizing coil connected in series-circuit relation to the field winding and a demagnetizing coil connected in parallel-circuit relation to the field winding and being wound to oppose the magnetic effect of the magnetizing coil, whereby the relay is caused to be completely demagnetized when the electric current through the field winding is decreased below a predetermined value, and means responsive to the demagnetization of the relay for causing stopping of the motor.

3. In a control system for an electric motor, a field-failure protective relay having a magnetizing coil and a demagnetizing coil, a motor having a field winding, said field winding and magnetizing coil being connected in series-circuit relation and said demagnetizing coil being wound to oppose the magnetizing effect of the magnetizing coil, whereby the relay is completely demagnetized when the field excitation is decreased to a predetermined value, and means responsive to the demagnetization of the field-failure protective relay to cause stopping of the motor.

4. In a field failure protective system, the combination with a dynamo-electric machine having an armature winding and a field-magnet winding, a circuit interrupter for controlling the armature circuit, and means for controlling the circuit interrupter, said means comprising a coil in series circuit relation with the field winding and tending to effect the closing of said circuit interrupter and a coil in shunt circuit relation with the field winding and tending to neutralize the action of said series coil thereby effecting the opening of the circuit interrupter when the current in the field winding drops to a predetermined low value.

5. A field failure protective system for electric motors, in combination, a source of electrical energy, a motor having an armature winding, a shunt field winding and a series field winding, a line contactor for controlling the armature circuit connections, and a field failure protective relay, including a magnetizing coil in series with the shunt field winding and a neutralizing winding connected directly to the source of electrical energy, for controlling the operation of the line contactor.

6. A field failure protective system for motors, comprising a motor having an armature winding, a series field winding, and a shunt field winding, a source of electrical energy, a line contactor for controlling the circuit connections of the armature and series field windings, a control relay for deenergizing the line contactor, and a relay responsive to a predetermined decrease of the current in the shunt field winding for controlling the operation of the control relay.

7. A field failure protective system for motors, in combination with a motor having an armature winding, a series field winding and a shunt field winding, a source of electrical energy, a line contactor for controlling the energization of the motor, and a relay, responsive to a predetermined decrease of the current in the shunt field winding over a predetermined interval of time, for controlling the line contactor.

8. A field failure protective system for motors, in combination with a motor having an armature winding, a series field winding, a source of electrical energy, a line contactor for disconnecting the armature and series field winding from the source of power, a relay having a coil in series with the shunt field winding and a second coil acting in opposition to the first coil connected directly to the source of energy, said relay being adapted to operate, to control the line contactor, when the current in the shunt field winding is maintained at a predetermined value for a predetermined interval of time.

PHELAN McSHANE.